Sept. 27, 1932.   E. A. STINSON   1,879,859
AIRPLANE CONTROL MECHANISM
Filed July 26, 1926   2 Sheets-Sheet 2
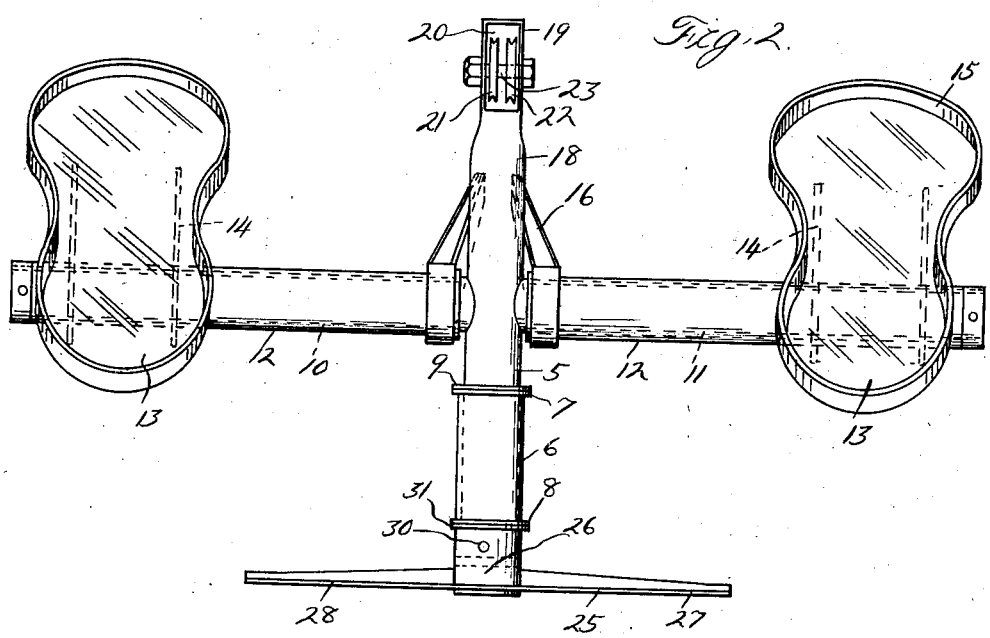
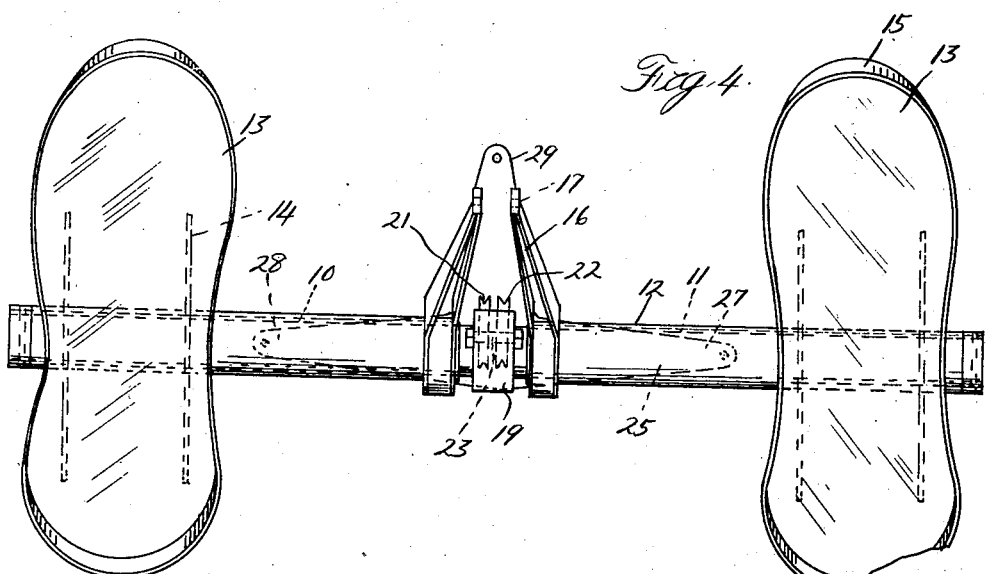
Inventor
Edward A. Stinson
By
Attorneys Patented Sept. 27, 1932

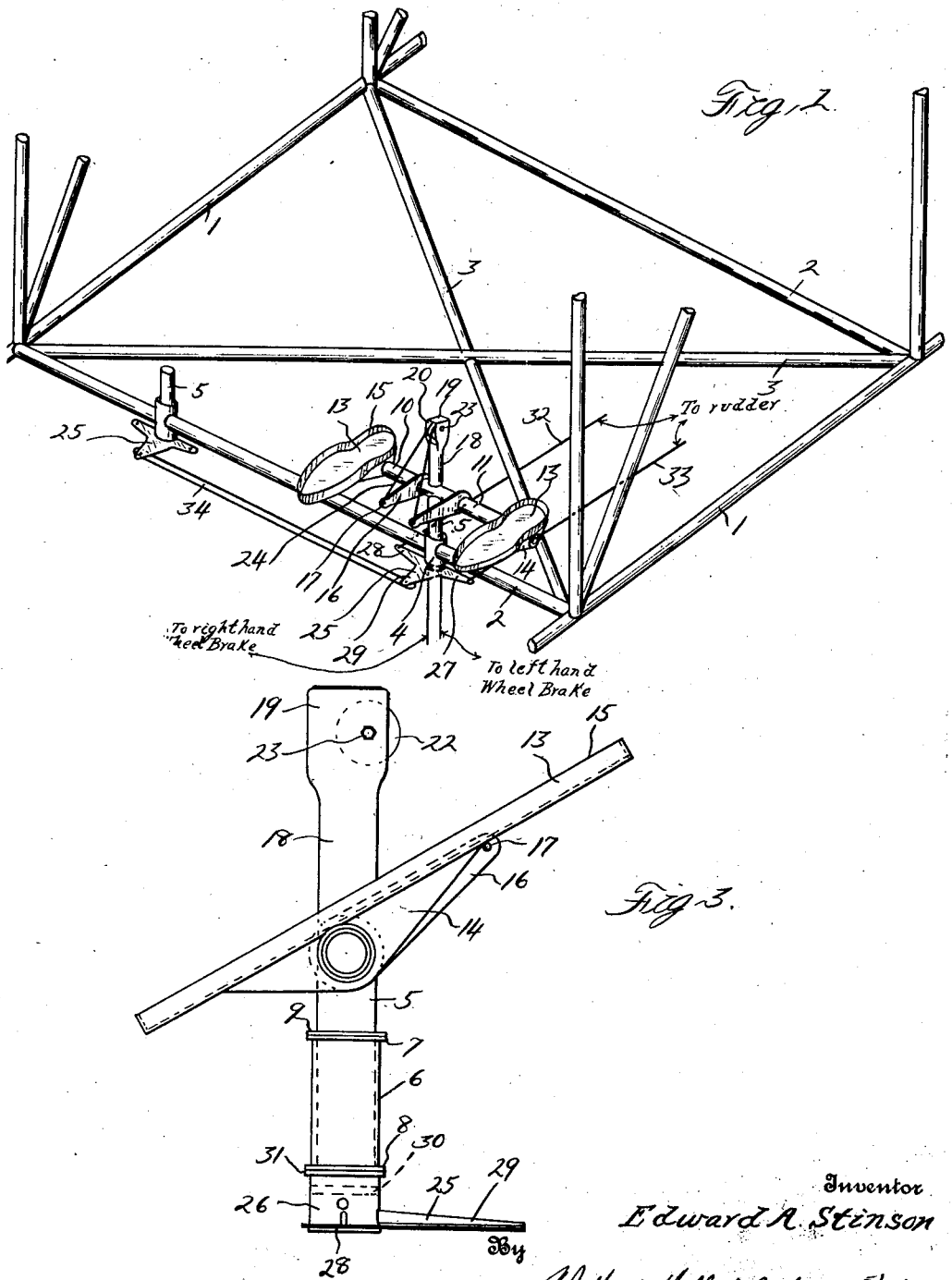

1,879,859

UNITED STATES PATENT OFFICE

EDWARD A. STINSON, OF NORTHVILLE, MICHIGAN, ASSIGNOR, BY MESNE ASSIGNMENTS, TO BENDIX BRAKE COMPANY, OF SOUTH BEND, INDIANA, A CORPORATION OF ILLINOIS

AIRPLANE CONTROL MECHANISM

Application filed July 26, 1926. Serial No. 125,032.

The invention relates to airplane control mechanism and is adapted particularly for an airplane in which the landing gear is provided with wheel brakes.

The primary object of the invention is to provide a control mechanism whereby the pilot is enabled to control with his feet both the rudder mechanism and the wheel brakes. A further object is to provide a construction permitting independent operation of the wheel brakes on opposite sides of the landing gear in order to facilitate the control of the airplane when landing or taxiing. These and other objects are attained by providing the novel construction hereinafter described and illustrated in the accompanying drawings, wherein Figure 1 is a perspective view of the control mechanism Figure 2 is a sectional elevation of the mechanism Figure 3 is a side elevation thereof Figure 4 is a plan view Referring now to the particular embodiment of the invention illustrated in the drawings, Figure 1 shows a portion of the frame of the airplane fuselage in which the numeral 1 refers to the longerons, 2 the cross tubes and 3 the diagonal braces. The control mechanism is preferably mounted on a cross tube of the frame and as shown this tube is provided with a transverse tubular bearing member 4 welded or otherwise secured to form a rigid structure. Within the tubular bearing is a vertical tubular shaft 5 having a bearing sleeve 6 surrounding the same and provided with the annular flanges 7 and 8 for engaging the bearing tube 4. The tube 5 is also provided with an annular flange 9 welded or otherwise secured thereto and forming a thrust bearing for engaging the flange 7 of the bearing tube. 10 and 11 are transversely extending tubular arms projecting outwardly from the shaft 5 and preferably secured thereto by welding. These arms together constitute the rudder bar and each is provided with a surrounding sleeve 12 adapted to oscillate about a horizontal axis. At the outer ends of the sleeves are arranged the pedals 13 which are rigidly connected thereto by means of the brackets 14. The pedals are preferably shaped to conform to the contour of a shoe and provided with the upstanding peripheral flanges 15. On the inner ends of the sleeves 12 adjacent the vertical shaft 5 there are the projecting levers or horns 16 having eyelets 17 at their outer extremities for receiving the ends of the operating cables.

The tubular shaft 5 has an extension 18 rising above the arms 10 and 11 carrying at the upper end a head 19 having an opening 20 on the side corresponding to the horns. 21 and 22 represent pulleys or sheaves journalled on rod 23 secured to the head the arrangement being such that the pulleys project slightly from the head 19 through the opening 20, the opposite side of the pulleys being within the head in alignment with the interior of the tubular shaft 5. Each of the horns 16 is connected by means of a cable 24 or other flexible element to the wheel brakes on the landing gear (not shown) and passes from the horn over one of the pulleys and thence downwardly through the hollow shaft 5.

At the lower end of the shaft 5 there is provided a horn 25 which as shown includes a hub 26 and the arms 27, 28 and 29. The hub is secured to the shaft 5 by suitable means such as the pins 30 and is provided at its upper end with an annular flange 31 for engaging the flange 8 on the bearing tube. The arms 27 and 28 have attached to their outer extremities the cables 32 and 33 leading to the rudder of the airplane in the conventional manner.

With the construction as thus far described it will be apparent that in order to operate the rudder it is only necessary to push forward on pedal 13 thereby oscillating the rudder bar about the vertical axis. This movement can be effected without operating the wheel brakes since the cables of this latter mechanism are supported by the pulleys 21 and 22 in approximate axial alignment with the vertical axis of the shaft 5. It will also be apparent that the operation of the wheel brakes can be effected in any position of the rudder bar by rocking the pedals about the horizontal axis thus transmitting the motion through the horns 16 to the cables connected to the brakes. Each of the pedals operates independently of the other and it is preferable to connect the right hand pedal to the right hand brake and the left hand pedal to the left hand brake so that the operator can selectively apply the brakes as desired. This arrangement facilitates the landing and taxiing of the airplane particularly when it is desired to make a turn.

It will be obvious that the location of the controlling mechanism is arranged adjacent to the pilot's seat and that if desired two or more mechanisms may be provided for dual control. In the particular embodiment of the invention I have shown a portion of a second control mechanism arranged at the side of the first mechanism, these two mechanisms having the respective rudder operating horns 25 connected together by a link 34 so as to synchronize the rudder control.

In the specific embodiment of the invention as above described it will be apparent that I have provided an airplane control mechanism in which the wheel brake operating means is associated with the rudder operating means in such a manner that the pilot can operate each means independently of the other by the manipulation of his feet, thereby leaving his hands free for operating the other control devices of the airplane. Furthermore the mechanism is so designed that the rudder control is operated in the conventional manner.

However, it is to be clearly understood that my invention is not limited to the particular construction illustrated for it is capable of embodiment in many other forms. Thus in its broader aspects my invention contemplates generally the association of a brake operating mechanism with rudder control mechanism in such a manner that each may be operated by the manipulation of the pilot's feet.

What I claim as my invention is:

1. In an airplane, the combination with a rudder operating mechanism having movable controlling means adapted to be operated by the foot of the pilot, of a brake operating mechanism carried by said rudder operating mechanism, said rudder operating mechanism having controlling means operable by a different movement of the pilot's foot.

2. In an airplane, the combination with a rudder operating mechanism, of a brake actuating mechanism carried by said rudder operating mechanism and comprising two separately operable pedals, and means for connecting the respective pedals to the right and left hand wheel brakes respectively, said means being movble independently of the rudder operating mechanism.

3. In an airplane, the combination with a foot operated member mounted for two different movements, of means for independently operating the rudder and a wheel brake by the respective movements of said member.

4. In an airplane, the combination with a rudder control mechanism, of a brake operating mechanism carried by the rudder control mechanism comprising two pedals mounted for movement independently of the rudder control mechanism and also independent of each other and means operable by the respective pedals for actuating the right and left hand wheel brakes respectively.

5. In a control mechanism for airplanes the combination with a pivotally mounted rudder bar, of a brake actuating mechanism carried by said rudder bar and independently movable thereon.

6. In a control mechanism for airplanes foot operated members mounted to oscillate about transverse axes, elements connected to said members adapted to be independently operated by the respective oscillating movements whereby a double foot control is effected, and means whereby the elements actuated by one of the oscillating movements of the foot operated members may be selectively controlled by the individual foot operated members.

7. A controlling mechanism for airplanes comprising a member pivotally mounted for oscillation about two different axes and elements adapted to be respectively connected to the wheel brakes and the rudder of the airplane, said elements being so connected to said member as to be independently actuated by the respective oscillatory movements about said axes.

8. A control mechanism for airplanes comprising a member pivotally mounted for oscillation about two transverse axes and elements adapted to be respectively connected to the wheel brakes and the rudder of the airplane, said elements being so connected to said member as to be independently actuated by the respective oscillatory movements thereof.

9. A control mechanism for airplanes comprising a pivotally mounted member, a connection between said member and the rudder of the airplane for actuating the latter by the oscillation of the member, a pair of pedals carried by said member and adapted to be independently oscillated about the axis transverse to said pivotally mounted member, and connections between said pedals and the wheel brakes of said airplane.

10. A control mechanism for airplanes comprising a member pivotally supported to oscillate about a vertical axis, a second member rotatable carried by the first member to oscillate about a horizontal axis and rudder and wheel brake mechanism elements respectively connected to said first and second members to be independently actuated by said oscillating movements.

11. A control mechanism for airplanes comprising a hollow supporting post, a membar journalled therein having oppositely extending arms, a sleeve rotatably mounted on each of said arms to oscillate about an axis transverse to the axis of said member, pedals secured to said sleeves, horns also connected to said sleeves, pulleys mounted on said member in approximate alignment with the axis of said post, and cables extending from said horns over said pulleys and through said hollow posts.

12. A control mechanism for airplanes comprising a hollow supporting post, a rudder bar journalled on said post, a pedal journalled on said rudder bar to oscillate about an axis transverse to the axis of said post, a bearing carried by said rudder bar and a flexible element connected to said pedal and passing over said bearing and through said hollow post.

13. A control mechanism for airplanes comprising a vertical hollow post, a member journalled therein, a pair of arms extending transversely to the axis of said member in opposite directions, a horn secured to said member for receiving the rudder control cables, a pair of sleeves journalled on the respective arms, a pedal on each sleeve, a pair of pulleys carried by said post above said arms and separate cables connected to each of said horns and passing over said pulleys through said hollow post.

14. An airplane having, in combination, rudder-controlling connections, a pair of brake-controlling connections, and a single pilot controlled operating member arranged for steering movement of the rudder-controlling connections and for selective operation of the brake-controlling connections to steer when on the ground, and also arranged for simultaneous operation of the brake-controlling connections to retard the motion of the airplane on the ground.

15. Steering and braking mechanism comprising, in combination, steering connections, braking connections, and an operating member movable about one axis to operate the steering connections and movable about a different axis to operate the braking connections without affecting the steering connections.

16. Steering and braking mechanism comprising, in combination, a rotatable steering member rockable about a transverse axis, steering means connected to the steering member to be operated by rotation of said member, and braking connections operated by rocking the rotatable member about said transverse axis.

17. Control mechanism comprising, in combination, a rudder, brakes, control devices engageable by the pilot's feet, connections to the rudder operated by one type of movement of the control devices, and connections to the brakes operated by a different type of movement of the control devices.

18. An airplane having, in combination, brakes, a rudder, a bar centrally pivoted and arranged for movement to control the rudder, and brake-applying means mounted on said bar adjacent its opposite ends and operable to apply the brakes without changing the position of said bar.

19. Controlling means comprising, in combination, brakes, a steering device, a bar centrally pivoted and arranged for movement to control the steering device, and brake-applying pedals mounted on opposite ends of said bar and operable to apply the brakes without changing the position of said bar.

20. Controlling means comprising, in combination, a centrally-pivoted bar having steering connections operated by its movement about its center, brake-applying connections, and operating members movable bodily to operate said bar and movable independently of said bar to operate the brake-applying connections, the brake-applying connections passing adjacent the center of said bar, to be substantially unaffected by its movement about its center.

21. Controlling means comprising, in combination, a centrally-pivoted bar having steering connections operated by its movement about its center, brake-applying connections, and operating members movable bodily to operate said bar and movable independently of said bar to operate the brake-applying connections, said brake-applying connections including levers pivoted on said bar on opposite sides of its center.

22. Controlling means comprising, in combination, a centrally-pivoted bar, operating levers extending along said bar and pivoted thereto on opposite sides of its center, pedals on the ends of the bar arranged to operate said levers, and means operated by said levers and passing adjacent the center of said bar to be operable independently of the position of the bar.

23. In an airplane having at least two wheels, a rudder operating device provided with foot position for engagement by the feet of a pilot, brakes for the airplane wheels, and brake operating means including a lever mounted adjacent to one foot position and connected to one wheel brake and a lever mounted adjacent the other foot position and connected to another wheel brake whereby the pilot may at will apply either or both brakes without removing his feet from the foot positions.

In testimony whereof I affix my signature.

EDWARD A. STINSON.